United States Patent

[11] 3,595,200

[72] Inventor Guido D. Cilento
 Madison Township, N.J.
[21] Appl. No. 734,143
[22] Filed June 3, 1968
[45] Patented July 27, 1971
[73] Assignee Fairfield Facility, Commercial Filters
 Division of the Carborundum Co.
 Lebanon, Ind.

[54] DIFFERENTIAL PRESSURE INDICATOR
 5 Claims, 4 Drawing Figs.
[52] U.S. Cl............................................. 116/70,
 148/31.57, 210/90, 340/227
[51] Int. Cl....................................................... G01l 19/12
[50] Field of Search............................................. 116/65, 70,
 117, 114; 75/170, 21; 148/31.57, 108, 101, 103;
 137/533.13; 210/85, 90; 33/DIG. 1; 335/302, 295;
 340/227

[56] References Cited
UNITED STATES PATENTS

| | | | |
|---|---|---|---|
| 1,976,230 | 10/1934 | Kato et al. | 335/302 |
| 2,280,437 | 4/1942 | Levesque | 335/295 |
| 2,694,166 | 11/1954 | Hadfield | 148/31.57 |
| 2,907,992 | 10/1959 | Bronikowski | 340/227 |
| 3,026,903 | 3/1962 | Roach | 137/533.13 |
| 3,089,066 | 5/1963 | Uc et al. | 317/159 |
| 3,140,690 | 7/1964 | Siebel | 116/70 |
| 3,154,049 | 10/1964 | Smith et al. | 116/70 |
| 3,220,375 | 11/1965 | Gruber et al. | 116/70 |
| 3,354,336 | 11/1967 | Rennick | 335/302 X |
| 3,364,897 | 1/1968 | Mouwen | 116/70 |
| 3,412,706 | 11/1968 | Topol et al. | 116/70 |
| 3,413,951 | 12/1968 | Keil et al. | 116/70 |
| 3,442,248 | 5/1969 | Parkinson et al. | 116/70 |
| 3,448,716 | 6/1969 | Smith | 116/70 |

Primary Examiner—Louis J. Capozi
Attorney—March, Gillette & Wyatt

ABSTRACT: A pressure-sensitive indicator comprises a housing having a first means movable towards and away from a first position. A second means, movable towards and away from the first means, is normally retained towards the first means when the first means is in the first position. The first and second means are spaced apart by separating means. The second means is retained away from the first means until the first means is returned to the first position.

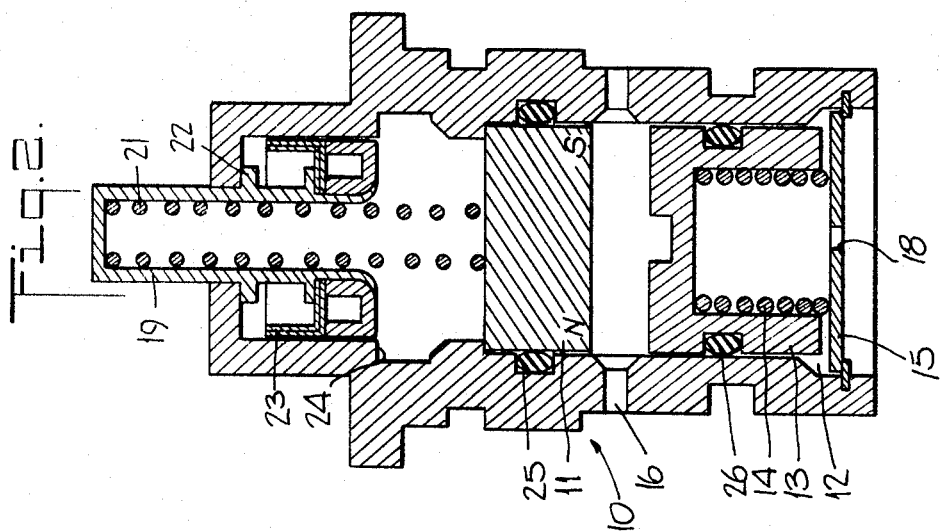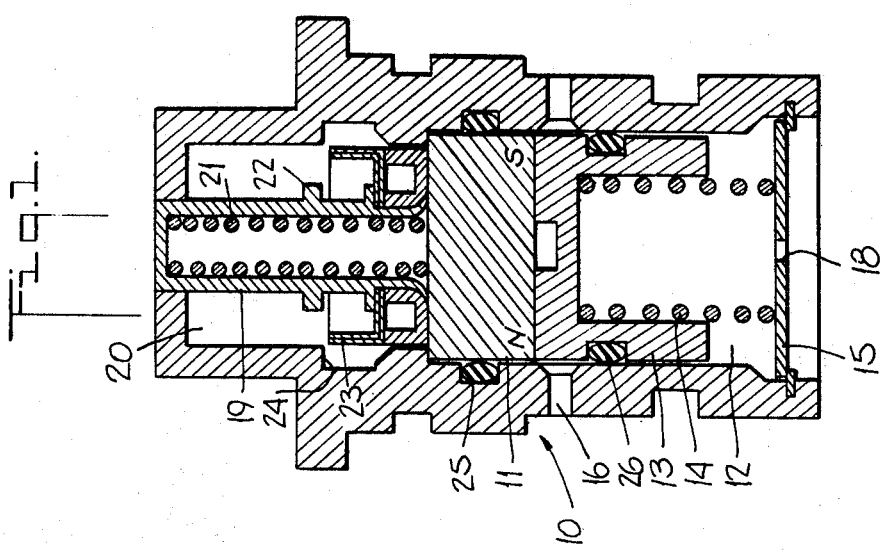

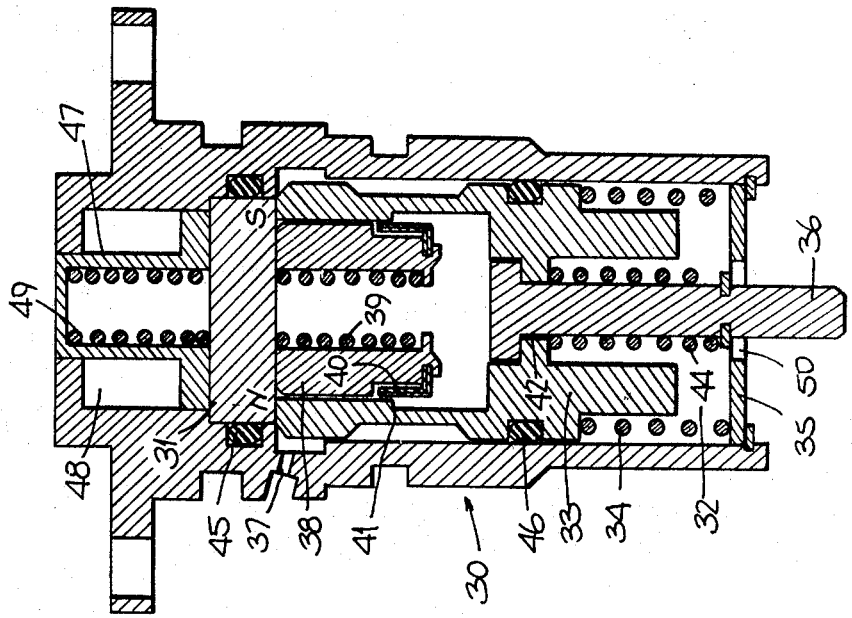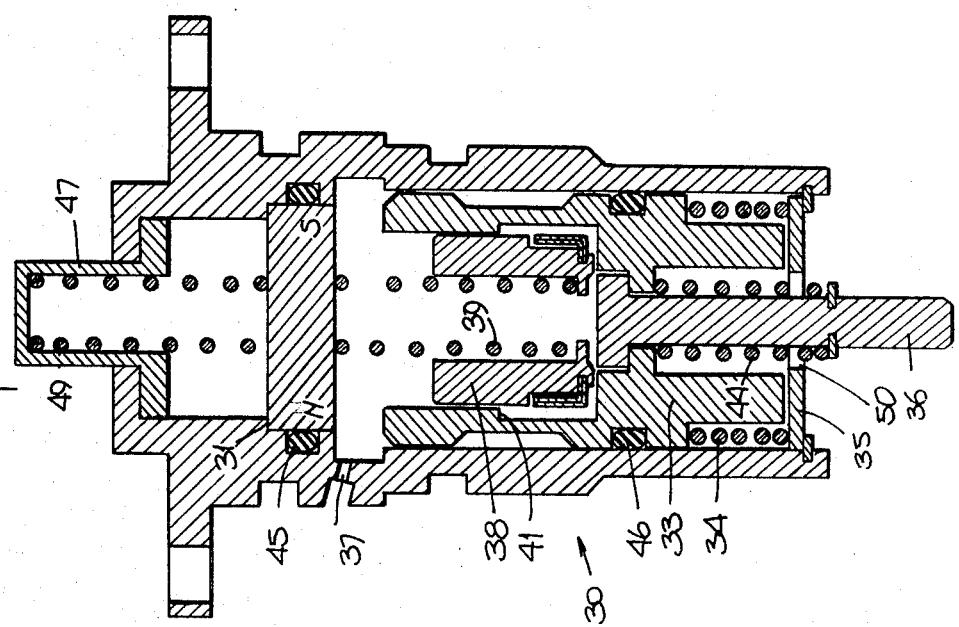

DIFFERENTIAL PRESSURE INDICATOR

Differential pressure indicating devices are so designed that a fluid pressure differential triggers an indicator. This triggering of the indicator is a sign that the filter is no longer functioning properly and should be replaced.

It is, therefore, an object of the present invention to provide an improved differential pressure indicator. Another object is to provide a differential pressure indicator having more simplified construction. A further object is to provide a more responsive differential pressure indicator. Yet another object is to provide a differential pressure indicator having more positive actuation. Still another object is to provide a more economical differential pressure indicator. These and other objects of the present invention will be apparent from the following description.

A differential pressure indicator comprises a housing having an indicator positioned within the housing. The indicator is maintained in nonindicating position within the housing by magnetic attraction. A magnet of variable strength and a piston are in the housing coaxially with the indicator. The piston is normally attracted to the magnet. The indicator is attracted to the magnet only when the piston is attracted to the magnet. Movement of the piston away from a first position adjacent the magnet by a predetermined pressure differential triggers the indicator. The indicator can only be reset after the piston is returned to its first position.

The invention is directed to a pressure-sensitive device comprising a housing, first means movable towards and away from a first position, second means movable towards and away from the first means and normally retained towards the first means by magnetic attraction when the first means is in the first position, means separating the first and second means and means for retaining the second means away from the first means until the first means is returned to the first position. The invention is directed to such a device wherein the means separating the first and second means comprise magnetic means. The invention is directed to such a device wherein the magnetic means has a variable flux along one face.

The invention is directed to such a device wherein the second means is provided with means for preventing actuation of the indicator when the temperature is below a predetermined value. The invention is directed to such a device wherein the means preventing actuation comprise a thermoresponsive member.

The invention is directed to such a device wherein the first means is movable from its first position by a predetermined pressure differential. The invention is directed to such a device wherein the first means returns to its first position when the pressure differential falls below the predetermined value.

The invention is directed to such a device wherein the first means is provided with means for preventing actuation of the indicator when the temperature is below a predetermined value. The invention is directed to such a device wherein the means preventing actuation comprise a thermoresponsive member.

The invention is directed to such a device wherein the first means is mounted concentrically with a member movable in response to a predetermined pressure differential. The invention is directed to such a device wherein movement of the member in response to a predetermined pressure moves the first means away from its first position when the temperature is above a predetermined value. The invention is directed to such a device wherein the member returns to its first position when the pressure differential falls below a predetermined value.

The invention is directed to such a device wherein the first means after movement away from its first position is retained away from its first position until reset.

FIGS. 1 and 2 are views in longitudinal section taken through a differential pressure indicator according to the invention.

FIGS. 3 and 4 are view in longitudinal section of a modified differential pressure indicator according to the invention.

The differential pressure indicator of FIGS. 1 and 2 comprises a housing 10 divided into two chambers by element 11, a material having variable magnetic attraction. A piston 13, mounted in lower chamber 12, is normally urged towards element 11 by bias means 14, which in this embodiment is a coil spring. A plate 15 seals the bottom of chamber 12. Fluid in communication with the upstream side of the filter (not shown) passes into chamber 12 between piston 13 and element 11 via inlet ducts 16 and/or 17. Plate 15 has a port 18 communicating with the downstream side of the filter.

An indicator 19 formed of magnetically attractive material is mounted in upper chamber 20. Bias means 21, which in this embodiment is a coil spring, normally urge indicator 19 away from element 11. When piston 13 is attracted to element 11, the attractive force between element 11 and indicator 19 serves to overcome the counteracting force exerted by bias means 21. Indicator 19 is provided with a stop 22 adapted to engage the underside of the top of housing when the indicator is actuated, as shown in FIG. 2, to limit the outward motion of indicator 19. The bottom portion of indicator 19 is provided with a bimetallic member 23. When the temperature of the housing 10 is below a predetermined value, bimetallic member 23 engages a cutout section 24 in the wall of chamber 20 thereby preventing actuation of indicator 19. At temperatures above a predetermined value, member 23 disengages section 24. With bimetallic member 23 engaging section 24, indicator 19 cannot be triggered regardless of the pressure differential that may exist. When the temperature is at or above a predetermined value, bimetallic member 23 disengages section 24 whereby indicator 19 can be triggered by a predetermined pressure differential.

Means are provided in housing 10 to prevent escape of fluid under pressure. In the embodiment shown, O-rings 25 and 26 are provided around element 11 and piston 13, respectively.

Element 11 is a material having variable magnetic attraction. It is magnetized on only one face. It exhibits strong attractive force on the polarized face, but the attractive force on the nonpolarized face is only a small fraction of the force on the other face. When the magnetized or polarized face is contacted by or approached by a magnetically attractive material, the attractive force on the other side increases. Alnico VIII is an example of a material having variable magnetic attraction.

The operation of the differential pressure indicator illustrated in FIGS. 1 and 2 will now be described.

When piston 13 is attracted to one face of element 11, the attractive force on the opposite face of element 11 is increased and the magnetic flux or field is more intense and has greater reach. In this condition, the attractive force exerted on indicator 19 by element 11 overcomes the force exerted by bias means 21 tending to urge indicator 19 away from element 11. This situation is shown in FIG. 1. When piston 13 is moved away from element 11, the attractive force on the opposite face of element 11 is decreased and the magnetic flux or field is less intense and has lesser reach. In this condition, the attractive force exerted on indicator 19 by element 11 is insufficient to overcome the force exerted by bias means 21 tending to urge indicator 19 away from element 11. This situation is shown in FIG. 2. The housing is attached to a filter assembly with inlet 16 communicating with the upstream side of the filter and inlet 18 communicating with the downstream side of the filter. As the filter becomes contaminated, the flow of fluid through the filter will become restricted and pressure on the upstream side of the filter will increase. This increase in pressure will be transmitted to housing 10 via inlet 16. When the pressure differential between the upstream and downstream sides of the filter reaches a predetermined value, the pressure will overcome counteracting forces and will separate piston 13 from element 11. Hence, movement of piston 13 away from element 11 due to a predetermined pressure differential, serves to trigger indicator 19 by reducing the attractive force exerted on indicator 19 by element 11.

As long as piston 13 is away from element 11, indicator 19 will return to its actuated position shown in FIG. 2 if depressed. Bimetallic element 23 engages cutout portion 24 of chamber 20 at temperatures below a predetermined value. In this position, it prevents indicator 19 from being delivered by bias means 21 to the position shown in FIG. 2 regardless of the position of piston 13. In this way, the indicator will be triggered by a pressure differential due to filter contamination rather than a temporary pressure differential due to temperature conditions, e.g., increased viscosity when starting the unit on which the filter is employed.

A modified differential pressure indicator is shown in FIGS. 3 and 4. Housing 30 is divided into two chambers by element 31, a material having variable magnetic attraction. A piston 33, mounted in lower chamber 32 is normally urged toward element 31 by bias means 34, which in this embodiment is a coil spring. A plate having an opening for a reset pin 36 seals the bottom of chamber 32. Fluid in communication with the upstream side of the filter (not shown) passes into chamber 32 via inlet duct 37. Plate 35 has an opening 50 communicating with the downstream side of the filter.

The upper portion of piston 33 is chambered to receive shunt 38 formed of magnetically attractive material, similar to element 13 described above with respect to FIGS. 1 and 2. Shunt 38 is attracted to and engages element 31 by magnetic attractive force which overcomes the counteracting force exerted by bias means 39, which in this embodiment is a coil spring, tending to move shunt 38 away from element 31. Bimetallic member 40 is mounted on the bottom and on the narrowed lower portion of shunt 38. A temperatures above a predetermined value, bimetallic member 40 engages flange 41 on the inner wall of the upper portion of piston 33.

Reset pin 36 passes through an orifice formed by circular flange 42 projecting from the inner wall of the lower portion of piston 33. The head of reset pin 36 is widened to prevent its passing through the orifice. The lower portion of reset pin 36 is provided with a flange 43. Bias means 44, which in this embodiment is a coil spring, is mounted between flanges 42 and 43.

Means are provided in housing 30 to prevent escape of fluid under pressure. In the embodiment shown, O-rings 45 and 46 are provided around element 31 and piston 33, respectively.

An indicator 47 is mounted in upper chamber 48. Bias means 49, which in this embodiment is a coil spring, normally urge indicator 47 away from element 31. When shunt 38 is attracted to element 31 as shown in FIG. 3, the attractive force between element 31 and indicator 47 serves to overcome the opposing force exerted by bias means 49.

The operation of the differential pressure indicator illustrated in FIGS. 3 and 4 will now be described. The housing is attached to a filter assembly with inlet 37 communicating with the upstream side of the filter and inlet 50 communicating with the downstream side of the filter. As the filter becomes contaminated, the flow of fluid through the filter will become restricted and pressure on the upstream side of the filter will increase. This increase in pressure will be transmitted to housing 30 by inlet 37. Shunt 38 is retained against element 31 by magnetic attractive force which is greater than the counteracting force of bias means 39. When the pressure differential between the upstream and the downstream sides of the filter reaches a predetermined value, the pressure will overcome the counteracting force exerted by bias means 34 urging piston 33 toward element 31, and will separate piston 33 from element 31. Once a predetermined temperature is attained, bimetallic member 40 on shunt 38 will engage flange 41. Thereafter, a predetermined pressure differential which forces piston 33 away from element 31 by overcoming the counterforce of bias means 34 will simultaneously pull shunt 38 away from element 31, as shown in FIG. 4. With shunt 38 away from element 31, the opposite face of element 31 loses magnetic flux intensity resulting in a lessened attractive force on indicator 47. This lessened force in insufficient to counteract the counteracting force of bias means 49. In consequence, spring 49 delivers indicator 47 to its actuated position as shown in FIG. 4. As long as shunt 38 remains away from element 31, indicator 47 will return to its actuated position if depressed.

When the pressure differential falls below the predetermined value, piston 33 will be returned by bias means 34 to its position against element 31. Shunt 38, however, will continue to be held away from element 31 by bias means 39. Indicator 47 will return to its actuated position if depressed, despite the pressure drop to below the predetermined value.

In order to depress indicator 47, it is necessary to remove housing 30 from the filter assembly and move shunt 38 against element 31 by activating reset pin 36. The magnetic attractive force between the element 31 and shunt 38 will then retain shunt 38 against element 31. In this situation the magnetic flux intensity on the opposite side of element 31 will increase and retain indicator 47 in nonactuated position once indicator 47 is depressed.

It will be understood to those skilled in the art that the differential pressure indicator of the present invention makes it possible to carry out the functions of known pressure-indicating devices with only one magnet as compared with a plurality of magnets. The differential pressure indicator of the present invention provides a more simplified, more responsive and more positively actuated mechanism.

A nonresettable feature is obtained by modifying the piston to include a shunt and a rest pin, with transfer of the thermal lockout strip to shunt piece.

It will be understood that the foregoing description with the details of exemplary structure is not to be construed in any way to limit the invention, but that modification may be made thereto without departing from the scope of the invention as set forth in the following claims.

What I claim is:

1. A pressure-sensitive device which comprises a housing;
   magnetic means fixed within said housing and defining therewith a first chamber and a second chamber;
   indicating means located in said first chamber, said indicating means being movable from a first position adjacent said magnetic means to a second position away from said magnetic means;
   pressure-sensitive means located in said second chamber, said pressure sensitive means being movable from a first position adjacent said magnetic means to a second position away from said magnetic means;
   first biasing means located in said first chamber for maintaining said indicating means its second position;
   second biasing means located in said second chamber for maintaining said pressure sensitive means in its first position;
   said magnetic means having a variable flux of lines of force such that when said pressure sensitive means is in its first position said indicating means is held by said magnetic means in its first position and when said pressure-sensitive means is in its first position and when said pressure-sensitive means is in its second position said indicating means is held in its second position by said first biasing means.

2. A device according to claim 1 wherein said indicating means is provided with a thermoresponsive member which maintains it in its first position below a predetermined temperature.

3. A device according to claim 1 wherein said pressure-sensitive means is provided with a thermoresponsive member which maintains it in its first position below a predetermined temperature.

4. A device according to claim 1 wherein said pressure-sensitive means is moved to its second position by a predetermined pressure differential.

5. A device according to claim 1 wherein said indicating means is maintained in its second position until reset.